UNITED STATES PATENT OFFICE.

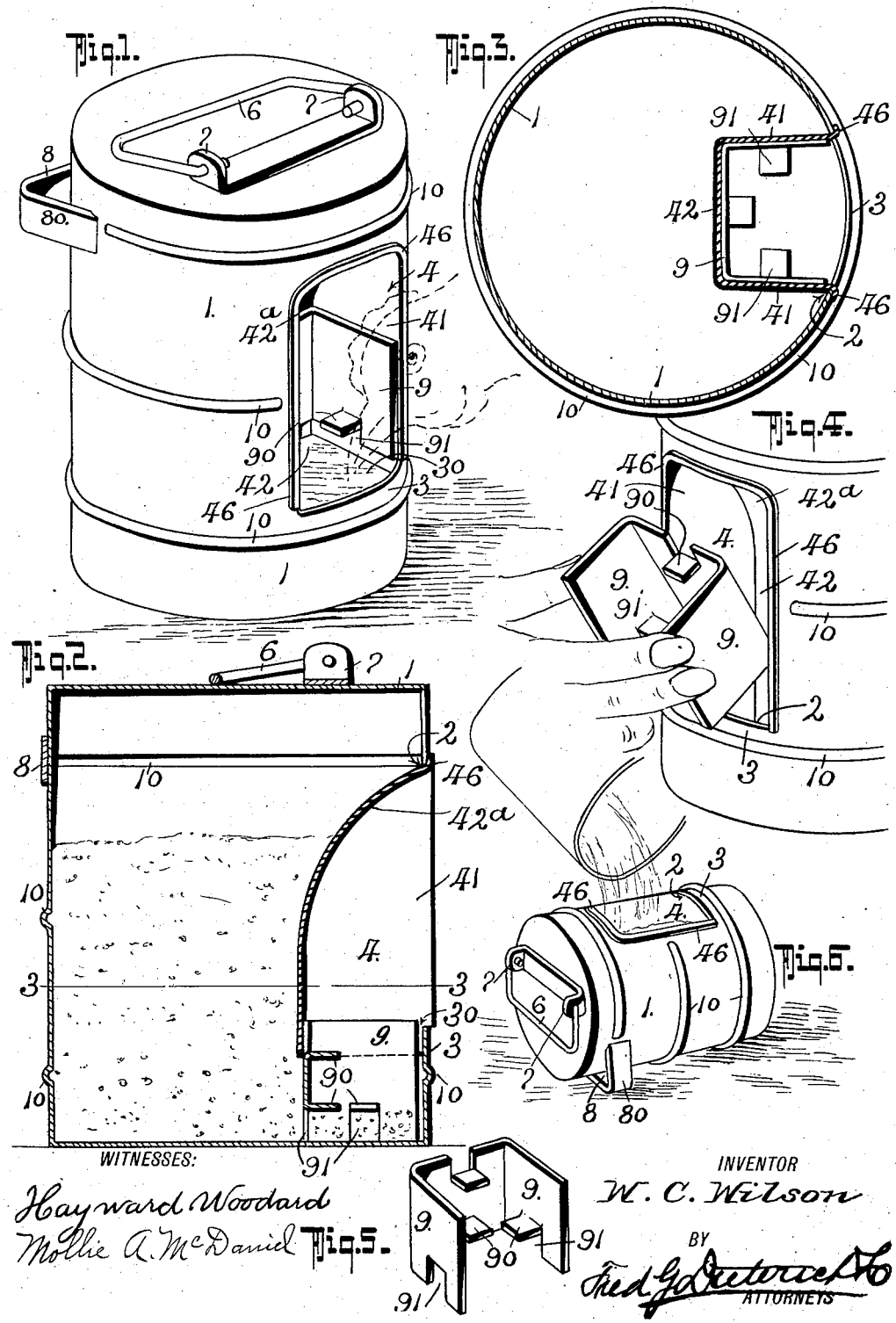

WINFRED C. WILSON, OF SUNSET, TEXAS.

POULTRY FEEDING AND WATERING DEVICE.

1,025,225.  Specification of Letters Patent.  Patented May 7, 1912.

Application filed May 6, 1911. Serial No. 625,521.

*To all whom it may concern:*

Be it known that I, WINFRED C. WILSON, a citizen of the United States, residing at Sunset, in the county of Montague and State of Texas, have invented a new and Improved Poultry Feeding and Watering Device, of which the following is a specification.

This invention relates to that class of watering and feeding means in which the water or food stuff is held in a storing vessel that has special provision for keeping a small quantity of the water or food stuff in sight and for easy access, and which amount is automatically replaced as the water or food stuff is consumed, and my said invention, more specifically has relation to poultry watering and feeding devices.

The primary object of my invention is to provide a simple, inexpensive and easily handled device of the general character stated, that can be utilized either as a dry grain feeder, or as a water fountain, and in which the construction is such that the same can be quickly filled with either water or grain, that can be easily emptied and cleaned, that can be conveniently shipped, and which can be used by large as well as young chickens.

With other objects in view that will be hereinafter set forth, my invention consists of a combined feeding and watering means that embodies the peculiar construction and arrangement of parts hereinafter described, specifically pointed out in the claims and illustrated in the accompanying drawings in which:—

Figure 1, is a perspective view that illustrates my invention applied for use as a poultry fountain. Fig. 2, is a vertical section of the same, with its parts arranged to form a dry grain feeder. Fig. 3, is a horizontal section of the same on the line 3—3 on Fig. 2. Fig. 4, is a detail perspective view of the trough side of the holder cup or funnel, the latter being shown as separated from the holder and as being inserted through the opening therein. Fig. 5, is the feed check or regulating slide member hereinafter referred to. Fig. 6, is a perspective view of the device, and shows the same in the filling position.

In its practical arrangement, my invention consists of a body or holder 1, which may be of any desired shape in cross section, but is preferably cylindrical, and for economy in manufacture is made of tin, and it should be stated it is made in different sizes. The holder 1 has a vertically elongated or funnel opening 2, the lower edge of which is somewhat above the bottom of the holder, whereby to provide a dam or curb portion 3 that forms the front wall of the watering or feed trough 30, as is best shown in Fig. 2, and to add strength the body 1 has one or more horizontal annular corrugations 10—10.

4 designates a dished shaped funnel, preferably stamped to the desired shape from a single piece of sheet metal and it consists of the sides 41 and a back member 42 that is dished or bent to such shape that the upper end 42$^a$ merges with the upper front edges of the sides 41. In cross section, the funnel 4 is of slightly less width than the opening 2 in the holder and is made slightly tapering inwardly, see Fig. 3, so the said funnel can be readily slipped through the said opening 2, to bring its front edges in alinement with the side and upper edges of the opening to which the said front edges are held watertight by soldering, and to facilitate the fitting of the said funnel to its operative position and also provide a perfect joining of the funnel with the body 1, the side and upper edges of the said funnel are turned with angle flanges 46 to lap the surrounding edges of the opening. The side flanges 46 do not extend the full depth of the funnel and thereby provide for placing the lower end of the funnel a short distance below the upper edge of the dam or curb portion 2, so as to produce a water seal and render the holder 1 air tight to cause the water to gradually feed from the holder into the trough and constantly keep the trough filled, as the water is consumed by the chicks.

6 designates a wire rod bail handle, the ends of which are hinged in ears 7—7, soldered or otherwise fastened on the top of the holder and 8 is a back rest consisting of a flat stiff metal strap that extends transversely of the holder and has its ends 80 turned inwardly and soldered to the said holder. The back rest serves to hold the cylindrical body from turning when it is placed in a horizontal position for filling, see Fig. 6.

So far as described, it will be readily apparent that the funnel construction 4 provides for a convenient filling of the holder 1 and since the lower end of the funnel is below the upper edge of the curb or wall 3, the water is trapped and kept from rising above the said upper edge of the wall 3, thus providing for a filled trough from which the chicks can readily drink, it being also understood that as the water level in the trough recedes to or slightly below the funnel, the water automatically flows and refills the trough.

9 designates a feed check device consisting of a tin or other springy sheet metal plate that is bent to a U shape, and is of a size to snugly fit into and frictionally engage the side walls of the funnel, the spring of the metal plate serving to retain the said check within the funnel and from falling out during ordinary uses of the holder. The lower edges of the check are slitted to form upwardly and inwardly bent ears 90 and feed openings 91, through which the grain passes into the trough when dry grain is held in the holder, it being obvious that the quantity of the grain fed through the said opening 91, can be regulated to suit the particular character of the grain used, by bending the ears 91, relatively to the openings checks the flow of the grain. The upper edge of the back members of the check is also slitted to form an inturned finger ear, by means of which the check device can be slid up or down within the funnel to the desired position.

For the small sizes of my combined grain and water feeding devices, the sizes that can be conveniently shipped by mail, the handle device, and the back rest members are milled to facilitate packing, but in the larger sizes the bail and back rest are preferably used.

While I have described my invention as especially adapted for feeding poultry the same may be made in sizes sufficiently large to adapt the same for feeding and watering cattle. For the size useful as a poultry feeder and fountain, the ordinary or conventional sealed fruit cans can be used, whose sides can be cut out to form the funnel opening, and by making the funnel of one piece with the flanged edges, not alone provides for a very inexpensive way of making the funnel, but also provides a quick and cheap way for connecting the funnel to the can.

What I claim is:

1. In a poultry device, a vessel closed at the top and bottom and having an opening in one side thereof, a funnel attached to the edges of the said opening and projected inside of the said vessel, said funnel having its open end at a point below the lower end of the opening in the side of the vessel whereby to form a collecting trough, and a check member removably and slidably mounted within the funnel for controlling the outfeed of the contents of the vessel into the said trough, the said check member consisting of a U-shaped spring metal body having its walls shaped to frictionally engage with the walls of the funnel.

2. In a poultry device, a vessel closed at the top and bottom and having an opening in one side thereof, a funnel attached to the edges of the said opening and projected inside of the said vessel, said funnel having its open end at a point below the lower end of the opening in the side of the vessel whereby to form a collecting trough, a check member removably and slidably mounted within the funnel for controlling the outfeed of the contents of the vessel into the said trough, the said check member consisting of a U-shaped spring metal body having its walls shaped to frictionally engage with the walls of the funnel, the lower end of the said check member body having an opening, and the upper edge of the said body having an inturned finger portion.

WINFRED C. WILSON.

Witnesses:
W. J. MESS,
O. G. JONES.